(12) United States Patent
Chhodavdia et al.

(10) Patent No.: US 11,231,941 B2
(45) Date of Patent: Jan. 25, 2022

(54) SYSTEMS AND METHODS FOR HARDWARE INITIALIZATION

(71) Applicant: Microsoft Technology Licensing, LLC, Redmond, WA (US)

(72) Inventors: Avdhesh Chhodavdia, Fremont, CA (US); Judy Crane, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 296 days.

(21) Appl. No.: 16/431,272

(22) Filed: Jun. 4, 2019

(65) Prior Publication Data

US 2020/0387386 A1 Dec. 10, 2020

(51) Int. Cl.
*G06F 9/445* (2018.01)
*G06F 9/448* (2018.01)

(52) U.S. Cl.
CPC .................................. *G06F 9/4498* (2018.02)

(58) Field of Classification Search
CPC ...................................................... G06F 9/4498
See application file for complete search history.

(56) References Cited

U.S. PATENT DOCUMENTS

| | | | | |
|---|---|---|---|---|
| 5,371,889 A | * | 12/1994 | Klein | G06F 9/466 718/106 |
| 6,108,887 A | * | 8/2000 | Ponamgi | G05B 19/41865 29/407.01 |
| 10,289,093 B1 | | 5/2019 | Lysaght et al. | |
| 2012/0068827 A1 | * | 3/2012 | Yi | G01D 5/185 340/10.1 |
| 2012/0173878 A1 | * | 7/2012 | Boehl | H04L 9/3247 713/176 |
| 2014/0032887 A1 | | 1/2014 | Vahidsafa | |
| 2014/0078629 A1 | * | 3/2014 | Cortigiani | H02H 9/02 361/79 |
| 2014/0149609 A1 | * | 5/2014 | Chan | G06F 13/385 710/16 |
| 2016/0109923 A1 | * | 4/2016 | Chen | G06F 1/3275 713/322 |
| 2018/0188322 A1 | * | 7/2018 | Rogel-Favila | G01R 31/31725 |

FOREIGN PATENT DOCUMENTS

WO 2016036442 A1 3/2016

OTHER PUBLICATIONS

"International Search Report and Written Opinion Issued in PCT Application No. PCT/US2020/029037", dated Jul. 9, 2020, 14 Pages.

* cited by examiner

*Primary Examiner* — Jae U Jeon
(74) *Attorney, Agent, or Firm* — Ray Quinney & Nebeker P.C.; John O. Carpenter

(57) ABSTRACT

A method for initializing components of an electronic device includes receiving an input signal at an initialization block; after receiving the input signal, changing a state of a finite state machine (FSM) of the initialization block; sending an initialization signal from the initialization block to a component on a chip; after sending the initialization signal, changing the state of the FSM; receiving a return signal from the component with the initialization block; and after receiving the return signal, changing the state of the FSM.

20 Claims, 6 Drawing Sheets

| State Type | State # | Inputs or Outputs | Input bypassers or Output qualifiers | mode0 | mode1 | mode2 |
|---|---|---|---|---|---|---|
| Wait for Input | 0 | power_up | | Yes | No | No |
| Wait for Input | 0 | enter_low_power | | No | Yes | No |
| Wait for Input | 0 | exit_low_power | | No | No | Yes |
| Assert Output | 1 | load_slot0_start, block0_bist_start | | Yes | No | No |
| Assert Output | 1 | mem_erase | | Yes | No | Yes |
| Wait for Input | 2 | lsm_block0_pass, block0_bist_done | | Yes | No | No |
| Assert Output | 3 | block0_rst_release | | Yes | No | No |
| Wait for Input | 4 | jtag_fuse_access | | Yes | No | No |
| Assert Output | 5 | load_sysfuse_start | | Yes | No | No |
| Wait for Input | 6 | lsm_sys_done | | Yes | No | No |
| Assert Output | 7 | switch_to_pll_clk | | Yes | No | Yes |
| Wait for Input | 8 | pll_clk_locked | | Yes | No | Yes |
| Assert Output | 9 | load_slot1_start | block1_bist_pass, block0_bist_pass | Yes | No | No |
| Wait for Input | 10 | prmem_repair_done | | Yes | No | No |
| Assert Output | 11 | prmem_erase_start | | Yes | Yes | Yes |
| Wait for Input | 12 | lsm_done | A0_bypass | Yes | No | Yes |
| Wait for Input | 12 | prmem_erase_done | | Yes | Yes | Yes |
| Assert Output | 13 | init_done | | Yes | Yes | Yes |
| Assert Output | 13 | init_success | block0_success, block2_success, mem_success | Yes | Yes | Yes |

FIG. 2

SYSTEMS AND METHODS FOR HARDWARE INITIALIZATION

BACKGROUND

Background and Relevant Art

Hardware initialization procedures change across devices and generations. This logic is important to a system, as errors during initialization of the electronic components prevent a chip or other device from booting. Corrections to a faulty initialization procedure consume larger amounts of time, resources, and finances.

Conventional initialization electronics and procedures include custom, fixed logic or microprocessors. The custom logic serves only small to medium intellectual property (IP) blocks and use logic developed for that IP block without any unifying methodology to define and implement a flexible initialization procedure. There is no support for different initialization modes such as powering up, entering a low power state, or exiting a low power state.

Larger IPs or system-on-chips (SoCs) use microprocessors or microsequencers. While this approach is very flexible and reusable, microprocessors come at significant area, time, and manufacturing cost.

BRIEF SUMMARY

In some embodiments, a method for initializing components of an electronic device includes receiving an input signal at an initialization block; after receiving the input signal, changing a state of a finite state machine (FSM) of the initialization block; sending an initialization signal from the initialization block to a component on a chip; after sending the initialization signal, changing the state of the FSM; receiving a return signal from the component with the initialization block; and after receiving the return signal, changing the state of the FSM.

In some embodiments, an electronic device for controlling hardware initialization includes an FSM and an input-output (IO) modifier. The FSM has a first set of states and a second set of states. The IO modifier has an input state and an output state. The IO modifier is in the input state when the FSM is in the first set of states, and the IO modifier is in the output state when the FSM is in the second set of states.

In some embodiments, a computer chip includes an initialization (INIT) block and an intellectual property (IP) block in direct communication with the INIT block. The INIT block includes an FSM and an IO modifier. The FSM has a first set of states and a second set of states. The IO modifier has an input state and an output state. The IO modifier is in the input state when the FSM is in the first set of states, and the IO modifier is in the output state when the FSM is in the second set of states.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 2 is a chart illustrating an embodiment of a definition table, according to at least embodiment of the present disclosure;

DETAILED DESCRIPTION

Figure 1:
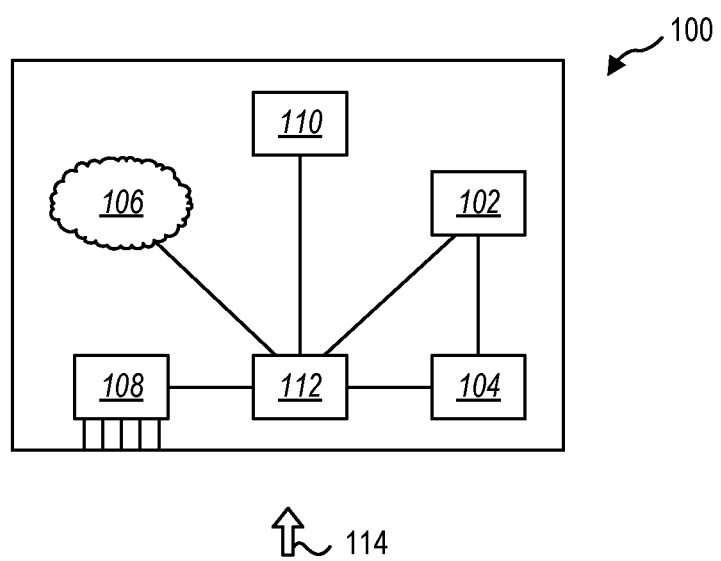
FIG. 1 is a schematic representation of circuit board with a plurality of components thereon, according to at least embodiment of the present disclosure.

This disclosure generally relates to devices, systems, and methods for initializing electronic hardware on a circuit board. More specifically, the present disclosure relates to a reusable hardware initialization (INIT) intellectual property (IP) block that initializes hardware on a circuit board. The INIT block includes a finite state machine (FSM) that allows the INIT block to transition between receive and transmit states. The INIT block also includes an input-output (IO) modifier that allows the INIT block to receive input signals from one or more components while in the receive state and to transmit one or more initialization signals to one or more components while in the transmit state.

The FSM of the INIT block can change between a first state or first set of states and a second state or second set of states. For example, the FSM can change between a "high" state and a "low" state. The high state and low state can be associated with a transmit state and receive state, respectively. In other examples, the FSM can increment in an integer counter that progresses through a numbered sequence while also providing an alternating "odd" state and an "even" state for the INIT block. The odd state and even state can be associated with a transmit state and receive state, respectively.

A conventional INIT block receives a reset command and begins a fixed series of hardware initialization procedures. The INIT block begins the process of initializing one or more components on a circuit board by sending an initialization signal to a first component, which in turn send a second signal to another component, and so forth. The process is conventionally determined for a particular device and is set in the silicon or wires of the device to be specific to the components of the electronic device. Therefore, each conventional INIT block architecture is made specifically for that device and is not reusable for other devices. Furthermore, the sequence is a fixed sequence and if, upon running the initialization sequence, any errors occur during the sequence, debugging and testing the sequence and the components is difficult or impossible.

An INIT block according to the present disclosure may increment through a discrete set of receive and transmit states that allow the INIT block to send and receive signals from each component of the device at each point in the initialization procedure. By routing signals through the INIT block, the INIT block becomes a centralized point through which a user or other system can view and debug the sequence.

Further, the discrete cycles of the receive and transmit states allow the INIT block to be scalable. An INIT block according to the present disclosure can read a definition table to correlate a FSM state to a group of potential inputs or outputs for each FSM state, and the definition table can include bypass and qualification conditions that allow the INIT block to adapt to different modes and different devices. In at least one embodiment, an INIT block architecture according to the present disclosure is usable in different devices by changing the definition table only.

FIG. 1 is a schematic representation of an electronic device 100 including a plurality of electronic components. The electronic device 100 includes fuses 102, a phase-locked loop (PLL) 104, a generic IP block 106, input-output (IO) block 108, device memory 110, and an INIT block 112.

The fuses 102 can communicate default values to the INIT block 112 to establish the circuits of the electronic device. The fuses 102 are commonly established first in the initialization procedure.

The PLL 104 provides macros and clock speeds for the electronic device 100. The PLL 104 is a control system that generates an output signal with a phase related to the phase of an input signal. There are different types off PLL with the simplest being an electronic circuit consisting of a variable frequency oscillator and a phase detector in a feedback loop. The oscillator generates a periodic signal, and the phase detector compares the phase of that signal with the phase of the input periodic signal, adjusting the oscillator to keep the phases matched.

Locking the input and output phase also, inherently, keeps the input and output frequencies the same. Therefore, in addition to synchronizing signals, a PLL 104 can track an input frequency, or it can generate a frequency that is a multiple of the input frequency. This, in turn, allows the PLL 104 of the electronic device 100 to set and synchronize the clock speed for the components of the electronic device 100.

The IP block 106 can be any IP block 106 that is available for a given task. In some embodiments, the IP block 106 can be a device related to audio, video display, motion control, input detection, or any other processing requirement of the electronic device. The IP block 106 can receive clock information that is provided by the PLL 104 either directly or through the INIT block 112. In some embodiments, the IP block 106 is in communication with a device memory 110. The device memory 110 may be in data communication with the INIT block 112. The INIT block 112 can provide an initialization signal to flash the device memory 110 and prepare the device memory 110 for use. For example, the device memory 110 may initially power on in a random state, and the initialization procedure can zero out or otherwise render the memory uniform for use.

In some embodiments, the INIT block 112 is in direct data communication, meaning there is a direct communication path without an intervening electronic component, with at least the fuses 102, the PLL 104, and the IP block 106. The INIT block 112 can receive an input signal 114 from the IO block 108 while in a receive state, and the INIT block 112 can compare the input signal 114 to a definition table to set a mode of the initialization procedure. The INIT block 112 then changes a state of the FSM of the INIT block 112 and continues the initialization procedure in a transmit state.

In some embodiments, the INIT block 112 has a definition table stored thereon. In other embodiments, the INIT block 112 is in data communication with a storage device having a definition table stored thereon. The INIT block 112 can parse the information in the definition table and perform an initialization procedure according to the definition table. In doing so, the architecture of the INIT block 112 is reusable, adaptable, and scalable for different applications. By changing the definition table, the functionality of the INIT block 112 can be modified without having to change the architecture of the INIT block 112 or any other components or wiring on the electronic device 100.

FIG. 2 is an exemplary embodiment of a definition table 116 that is enforced by the INIT block. The definition table 116 includes a state type 118 and/or a state number 120 provided by the FSM of the INIT block. In some examples, the state type 118 is based upon the state number 120. The definition table 116 illustrated in FIG. 2 is enforced by an INIT block with an incrementing integer FSM. With each change in FSM state, the FSM counter increments by one integer value. An even number in the state number 120 correlates to a "Wait for Input" or receive state type 118. An odd number in the state number 120 correlates to an "Assert Output" or transmit state type 118. In other examples, the FSM may toggle between two or more finite states, such as 0 and 1 or High and Low, that correlated to the "Wait for Input" or receive state type 118 and the "Assert Output" or transmit state type 118 without incrementing a state number 120.

Incrementing a state number 120 allows additional functionality of debugging different points in the initialization procedure, as well as bypass functionality. For example, the inputs or outputs 122 column of the definition table 116 provides instruction and/or conditions for the INIT block at each state number 120 of the FSM.

At state number 0, the INIT block is in a Receive state and is waiting for input to be received by the IO modifier of the INIT block. In some embodiments, a state number 120 includes a plurality of inputs commands that the INIT block will recognize at that state number 120. In some examples, the IO modifier can allow the INIT block to receive input commands from a plurality of sources. The received input is recognized as one of a power_up, enter_low_power, or exit_low_power inputs. Each of the inputs indicate that the INIT block is needed to initialize the components of the electronic device into a particular state: in the presented definition table 116, these include either powering up into a high power mode, entering a low power mode, or exiting from the low power mode into the high power mode. The definition table 116 further includes mode columns 124 that identify mode of the input command and the state numbers 120 of the definition table 116 associated with that mode column 124.

For example, the power_up input is received by the INIT block during state number 0 and the INIT block identifies the power_up input as putting the INIT block in mode0 according to the mode columns 124. After receiving the input command, the FSM of the INIT block changes state and increments by 1 integer value to state number 1.

State number 1 is an odd value state number 120, so the INIT block enters an "Assert output" or Transmit state type 118. In some embodiments, a state number 120 includes a plurality of initialization commands that the INIT block will transmit at that state number 120. For example, the IO modifier can transmit a plurality of initialization commands and/or transmit to a plurality of components of the electronic device. When the INIT block is in mode0 after receiving the power_up input, the mode columns 124 of the definition table 116 identify two outputs in the state number 1. In mode0, both the load_slot0_start, block0_bist_state and the mem_erase outputs are asserted. In mode2 (associated with exiting a low power state and entering a high power state), only the mem_erase output is asserted. In mode1, (associated with enter a low power state), no outputs are asserted at state number 1.

The FSM then changes state again, such as incrementing the state number 120 by one integer value again, and the INIT block enters state number 2. The even state number 120 results in the INIT block entering a Receive state type 118 and waiting for an input command when the INIT block is in mode0.

When the INIT block, through the IO modifier, receives the lsm_block0_pass and block0_bist_done input commands (indicating a self-test has completed), the FSM changes state again, and the INIT block enters state number 3. The INIT block continues through the initialization procedure according to the definition table 116 until encountering a state number 120 that includes an input bypasser or output qualifier 126. For example, the state number 9, in which the INIT block is in a Transmit state, requires a block1_bist_pass and block0_bist_pass to be true to assert the load_slot1_start command. Otherwise, the state number will increment again without asserting the load_slot1_start command.

Including an input bypasser or output qualifier 126 in the definition table 116 allows the INIT to perform basic checks and allows for timeout conditions to prevent the initialization procedure from failing, hanging, or initializing a component before other prerequisite components are initialized. Further, because initialization commands and inputs from the initialized components pass through the INIT block, an INIT block according to the present disclosure becomes a centralized component through which all parts of the initialization procedure can be monitored and debugged.

Figure 3:
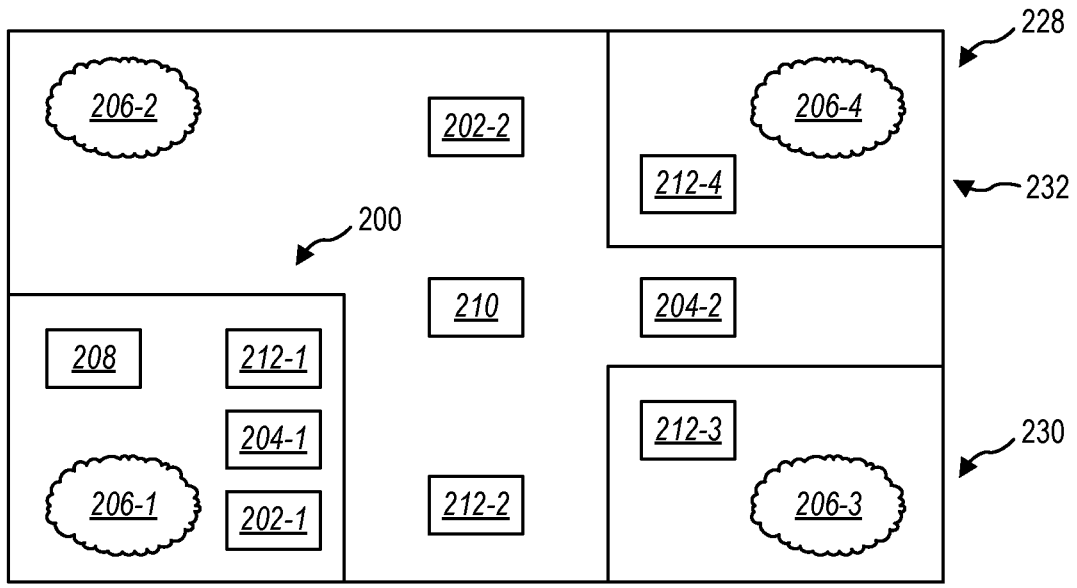
FIG. 3 is a schematic representation of circuit board with a plurality of subsystems thereon, according to at least embodiment of the present disclosure.

A flexible and customizable INIT block according to the present disclosure can be particularly beneficial in a nest system, such as a system on chip (SOC) 228 illustrated in FIG. 3. The SOC 228 includes an electronic device 200, which may be similar to the electronic device 100 described in relation to FIG. 1. The SOC 228 also includes other devices and/or systems on the SOC 228, such as a first subsystem 230 and a second subsystem 232. The electronic device 200 includes a first set of fuses 202-1, a first PLL 204-1, a first IP block 206-1, an IO block 208, and a first INIT block 212-1 according to the present disclosure. The SOC 228, itself, includes a second set of fuses 202-2, a second PLL 204-2, a second IP block 206-2, system memory 210, and a second INIT block 212-2 according to the present disclosure. The first subsystem 230 of the SOC 228 includes at least a third IP block 206-3 and a third INIT block 212-3, and the second subsystem 232 of the SOC 228 includes at least a fourth IP block 206-4 and a fourth INIT block 212-4.

The different components and different subsystems of the SOC 228 are each in communication with one another. For example, the electronic device 200 on the SOC 228 is in data communication with second INIT block 212-2 of the SOC 228. The second INIT block 212-2 can be in data communication with the other INIT blocks 212-1, 212-3, 212-4. Because an INIT block 212-1, 212-2, 212-3, 212-4 according to the present disclosure is a central hub for initialization procedures, data communication between each of the INIT blocks 212-1, 212-2, 212-3, 212-4 in a SOC 228 or other nested system allows initialization of the entire SOC 228 using feedback through the other subsystems and components of the SOC 228. Additionally, the bypasses and qualifiers allow the INIT blocks 212-1, 212-2, 212-3, 212-4 to initialize or reinitialize only the portion of the SOC 228 needed during power up, state changes, or mode changes.

In some embodiments, the INIT block 212-2 of the SOC 228 is a central INIT block that is in direct data communication with one or more INIT blocks of subsystems 230, 232. The central INIT block enforces the order and dependencies of the components of the SOC 228 and subsystems during the initialization procedure.

Figure 4:
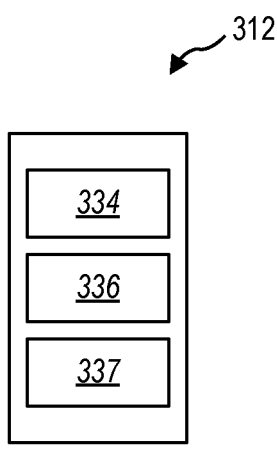
FIG. 4 is a schematic representation of a partitioned initialization block, according to at least embodiment of the present disclosure.

FIG. 4 is a schematic representation of an INIT block 312, according to the present disclosure. In order to change between Transmit and Receive states and to communicate with other components on a chip, an INIT block 312 has a FSM 334 and an IO modifier 336 in the INIT block 312. The INIT block 312 can further include memory 337 that stores information thereon, such as a definition table used to determine input or output logic for the INIT block 312. In some embodiments, the INIT block 312 shares a die with one or more of the other electronic components.

The FSM 334 is any finite state device that changes between discrete states during operation. For example, a FSM 334 can change between any number of finite states. While the example of an FSM 334 described in relation to FIG. 2 is an integer counter with finite states of integers, other FSMs may toggle or cycle between a limited number of states. For example, the integer counter FSM described herein provides both a state number and a state type. In other embodiments, a FSM can toggle between two finite states to provide the state type. In yet other embodiments, an INIT block 312 can have a first FSM that toggles between two states and provide the state type while a second FSM provides state numbers.

The IO modifier 336 provides communication between the INIT block 312 and other components. The IO modifier 336 receives inputs from a plurality of components and can aggregate the inputs into a single signal that can be compared to the state number and/or state type and to the definition table. The IO modifier 336 may be in communication with a memory 337 that contains the definition table.

The IO modifier 336 can parse the definition table and provide input logic and output logic based on the contents of the definition table. The code, therefore, can be changed by simply providing a new definition table for different applications of the INIT block architecture.

For example, the sample table below includes a relatively simple instance of a definition table that alternates between an input state and an output state:

| State Type | State num | Inputs/ Outputs | Input_bypassers/ Output_qualifers | mode0 | mode1 | pulse/ level |
|---|---|---|---|---|---|---|
| input state | 0 | sig_000 & sig_001 | | Yes | Yes | level |
| output state | 1 | sig_010, sig_011 | | Yes | Yes | level |
| input state | 2 | sig_020 | bypasser_020 | Yes | No | level |
| output state | 3 | sig_030 | qualifer_030 | Yes | No | level |
| input state | 4 | sig_040 | | Yes | No | level |
| output state | 5 | sig_050 | | Yes | No | level |
| input state | 6 | sig_060 | | No | yes | level |
| output state | 7 | sig_070 | | No | yes | level |
| input state | 8 | sig_080 | | No | yes | pulse |
| output state | 9 | sig_090 | | No | yes | pulse |

Based on the above table, the INIT block can parse the definition table to identify what input to wait for and what output to assert in each of the state numbers. The table also provides the mode and the switch type (pulse or level switch) of the associated signal.

An INIT block can parse the provided generic table and automatically generate the following sample code:

```
//auto generate output LEVEL logic for output state# 3
logic sig_030;
logic set sig_030;
logic reset_sig_030;
always @ (posedge hsp_clk or negedge reset_na)
    if ( ~reset_na )
        sig_030 <= 0;
    else if( set_sig_030 )
        sig_030 <= 1;
    else if( reset_sig_030 )
        sig_030 <= 0;
assign set_sig_030 = (count_next == 'd3 & (qualifer_030 )) & (mode0 );
assign reset_sig_030 = (count == 'd0) & (mode0 );
//auto generate input logic for input state# 4
logic input_4;
assign input_4 = (sig_040) | mode1 ;
//auto generate output LEVEL logic for output state# 5
logic sig_050;
logic set_sig_050;
logic reset_sig_050;
always @ (posedge hsp_clk or negedge reset_na)
    if ( ~reset_na )
        sig_050 <= 0;
    else if ( set_sig_050 )
        sig_050 <= 1;
    else if ( reset_sig_050 )
        sig_050 <= 0;
assign set_sig_050 = (count_next == 'd5 ) & (mode0 );
assign reset_sig_050 = (count == 'd0) & (mode0 );
//auto generate input logic for input state# 6
logic input_6;
assign input_6 = (sig_060) | mode0 ;
//auto generate output LEVEL logic for output state# 7
logic sig_070;
logic set_sig_070;
logic reset_sig_070;
always @ (posedge hsp_clk or negedge reset_na)
    if ( ~reset_na )
        sig_070 <= 0;
    else if ( set_sig_070 )
        sig_070 <= 1;
    else if ( reset_sig_070 )
        sig_070 <= 0;
assign set_sig_070 = (count_next == 'd7 ) & ( | mode1 );
assign reset_sig_070 = (count == 'd0) & ( | mode1 );
//auto generate input logic for input state# 8
logic input_8;
logic sig_080_lev;
always @ (posedge hsp_clk or negedge reset_na)
    if ( ~reset na )
        sig_080_lev <= 0;
    else if ( sig_080 )
        sig_080_lev <= 1;
    else if ( count_next == 'd0 )
        sig_080_lev <= 0;
assign input_8 = (sig_080_lev) | mode0 ;
//auto generate output PULSE logic for output state# 9
logic sig_090;
logic set_sig_090;
logic reset_sig_090;
always @ (posedge hsp_clk or negedge reset_na)
    if ( ~reset_na )
        sig_090 <= 0;
    else if ( set_sig_090 )
        sig_090 <= 1;
    else if ( reset_sig_090 )
        sig_090 <= 0;
assign set_sig_090 = (count_next == 'd9 ) & ( | mode1 );
assign reset_sig_090 = (count == 'd9 ) & ( | mode1 );
```

The expression of this automatically generated code allows the INIT block 312 architecture described herein to be customized and scaled to different electronic devices, systems, subsystems, and chips by changing the definition table only. This reduces the risk of errors converting engineering intent to implementation. Further, the INIT block becomes adaptive based on the signals received from different components at different points in the initialization procedure.

Over a sideband test interface, all inputs and outputs to the INIT block 312 are observable. Inputs into the INIT block 312 can step through states or jump states to aid in debugging or repeating state numbers. For example, a component in data communication with the INIT block 312 may fail a BIST. An input command provided to the INIT block 312 in response to the failed BIST can set the state number to rerun a portion of the initialization procedure. This can attempt to reinitialize the component that failed a self test and correct the initialization procedure of that component without either rerunning the entire initialization procedure.

Furthermore, changes to other components or changes to the operational state of other components does not necessitate a change in the INIT block, and visa versa. The interfaces for the IP blocks and other components can remain the same while the INIT block can adapt to the interfaces of the other components.

Figure 5:
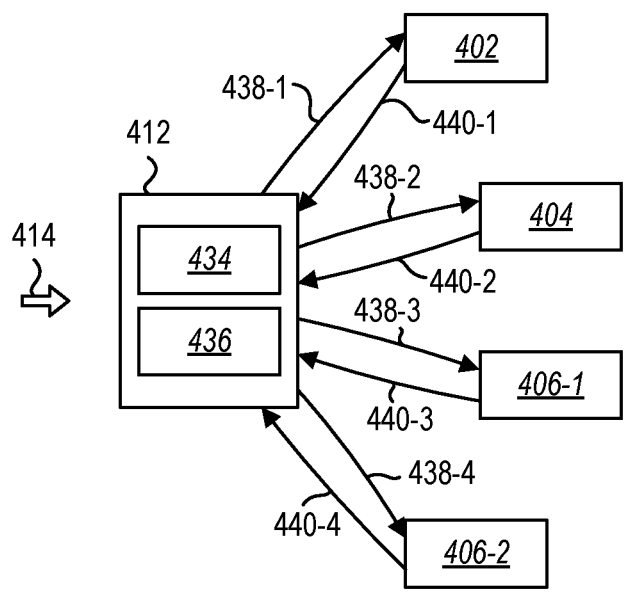
FIG. 5 is a schematic representation of an initialization block in data communication with a plurality of electronic components, according to at least embodiment of the present disclosure.

FIG. 5 is a schematic representation of an INIT block 412 in direct communication with each of the components of a system. The system has fuses 402, a PLL 404, a first IP block 406-1, and a second IP block 406-2. The INIT block 412 can receive an input signal 414 that begins an initialization procedure. In some embodiments, the input signal 414 is received from another location on the chip, such as with a subsystem of a SOC. In other embodiments, the input signal 414 is received from an external source not on the chip, such as another electronic device including a communication device for remote startups, power supplies, another circuit board, or other external sources.

The INIT block 412 can send a first output signal 438-1 to a first component, such as the fuses 402, to request information about the first component. The first component sends a first return signal 440-1 to the INIT block 412, which receives the first return signal 440-1 with the IO modifier 436. The INIT block 412 compares the first return signal 440-1 to code automatically generated from the definition table.

When the first return signal 440-1 is recognized, the INIT block 412 can send the second output signal 438-2 to the second component in the initialization procedure. In an example, the second component is the PLL 404 and the second output signal 440-2 can instruct the PLL to lock the clock speed. The PLL 404 can provide a second return signal 440-2 to the INIT block 412 that confirms or communicates the clock speed of the PLL 404. Each time an output signal is asserted, or a return signal is recognized, the FSM 434 changes state, and INIT block 412 moves down the definition table.

Now that the clock speed is locked with the PLL 404, the INIT block 412 can initialize the first IP block 406-1 with a third output signal 438-3. After the first IP block 406-1 has received the third output signal 438-3 and initialized, a third return signal 440-3 informs the INIT block 412 that the first IP block 406-1 is initialized and, for example, has passed a self test.

The INIT block 412 can then initialize the second IP block 406-2 with a fourth output signal 438-4. After the second IP block 406-2 has received the fourth output signal 438-4 and initialized, a fourth return signal 440-4 informs the INIT block 412 that the second IP block 406-2 is initialized and, for example, has passed a self test.

In another example, the INIT block 412 can assert the third output signal 438-3 to the first IP block 406-1 and the fourth output signal 438-4 to the second IP block 406-2 at the same time. Based upon the state of the FSM 434 and the definition table, the INIT block 412 can recognize the second return signal 440-2 from the PLL 404 and initialize the first IP block 406-1 and the second IP block 406-2 at the same time if there is no dependency on the order of the IP blocks 406-1, 406-2 initializing. In some modes, however, only one of the IP blocks may need to be initialized or the IP blocks may need to be initialized in a particular order. By setting a mode of the initialization procedure as described in relation to FIG. 2, the INIT block 412 can adapt to different modes and system needs.

Figure 6:
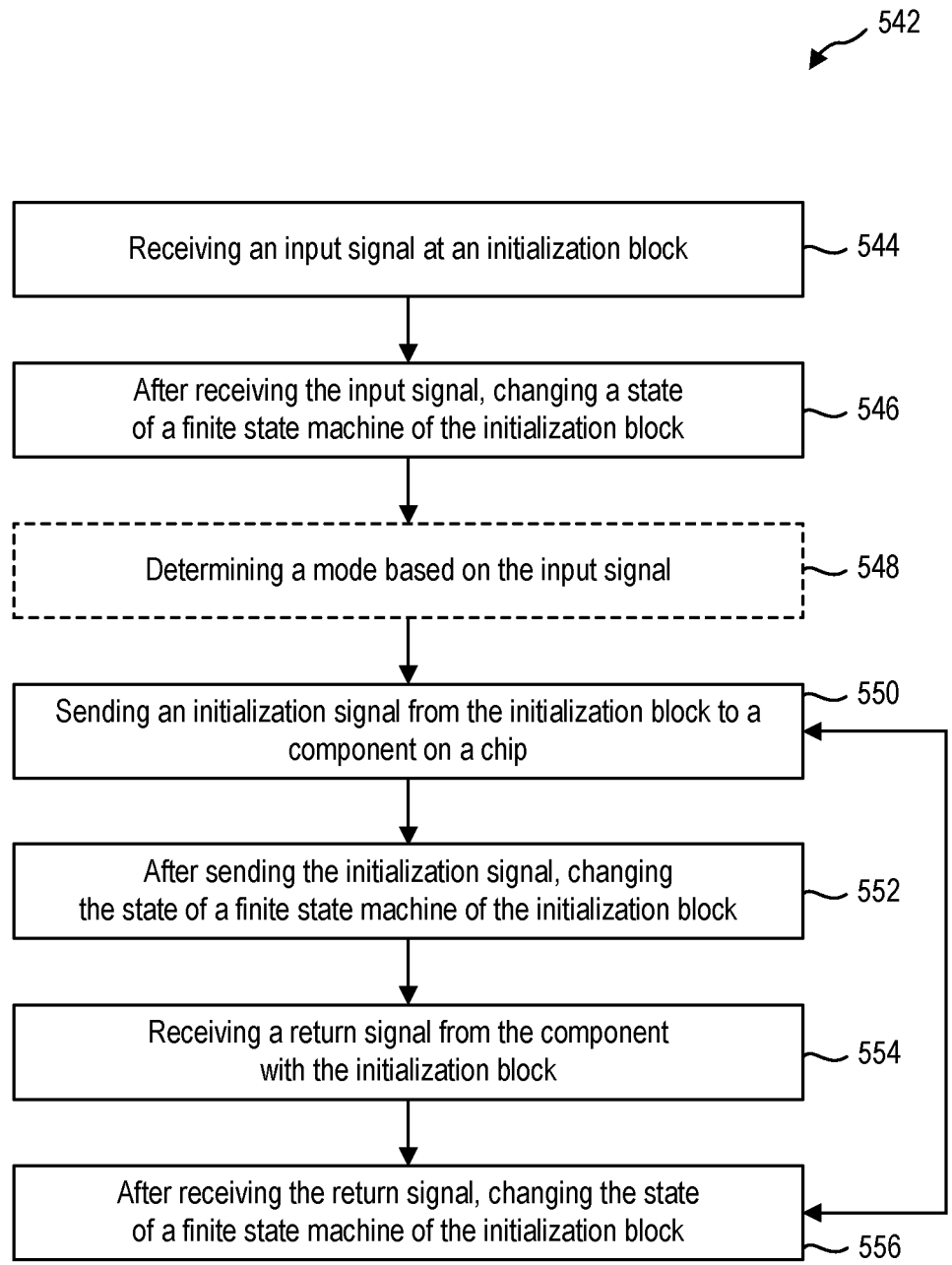
FIG. 6 is a flowchart illustrating a method of modular hardware initialization, according to at least embodiment of the present disclosure.

FIG. 6 is a flowchart that illustrates an embodiment of a general method 542 of initializing hardware components using an INIT block according to the present disclosure. The method 542 includes receiving an input signal at an initialization block at 544. The input signal may originate from a local source on the chip, or a remote source that communicates with the chip, for example through an IO block or directly with the INIT block. In at least one case, the input signal is a power_up signal from a power supply.

After receiving the input signal, the method 542 includes changing the state of a FSM of the initialization block at 546. In some embodiments, changing the state of the FSM includes toggling the state from a first state to a second state. In other embodiments, changing the state of the FSM includes incrementing a counter of the FSM. In yet other embodiments, changing the state of the FSM includes incrementing a counter and toggling between a first state and a second state. For example, the FSM can increment an integer counter, while the incremented integer is a member of either an odd set or an even set of integers. In other examples, the FSM can include two FSMs, providing independent control of toggling between a first state and a second state and an incrementing counter.

The method 542 can optionally include determining a mode based on the input signal at 548. The input signal, as described herein, can originate from a variety of sources. In some embodiments, a mode is determined based on the source of the input signal. For example, a power_up input signal and that is associated with a mode0 of the initialization procedure may originate from a different source than a enter_low_power input signal. In other embodiments, a mode is determined by the data included in the input signal. For example, an enter_low_power input signal may include data to set a particular value to high while an exit_low_power input signal may include data to set that same value to low. In other embodiments, a mode is determined by a voltage of the input signal. For example, the input signal may be a simple voltage applied to an IO block or to the INIT block, and different voltages may correlate to a mode0, mode1, mode2, etc. of the initialization procedure.

After receiving the input signal to begin the initialization procedure, the initialization procedure may be executed according to a series of communication loops. In some embodiments, the communication loop can include sending an initialization signal from the initialization block to a component on a chip at 550. After sending the initialization signal, the method 542 further includes changing the state of the FSM again at 552. As described herein, changing the state of the FSM can include incrementing a counter, toggling a state, or both.

The initialization signal send to the component will initialize the component and prompt a return signal from the component to the INIT block. The method 542 further includes receiving the return signal from the component at the INIT block 554 and then changing the state of the FSM at 556. The method 542 can repeat the sending portion at 550 and receiving portion at 552 of the method 542 (and associated FSM state changes at 552 and 556) to communicate with additional components to initialize the entire chip and/or device.

Figure 7:
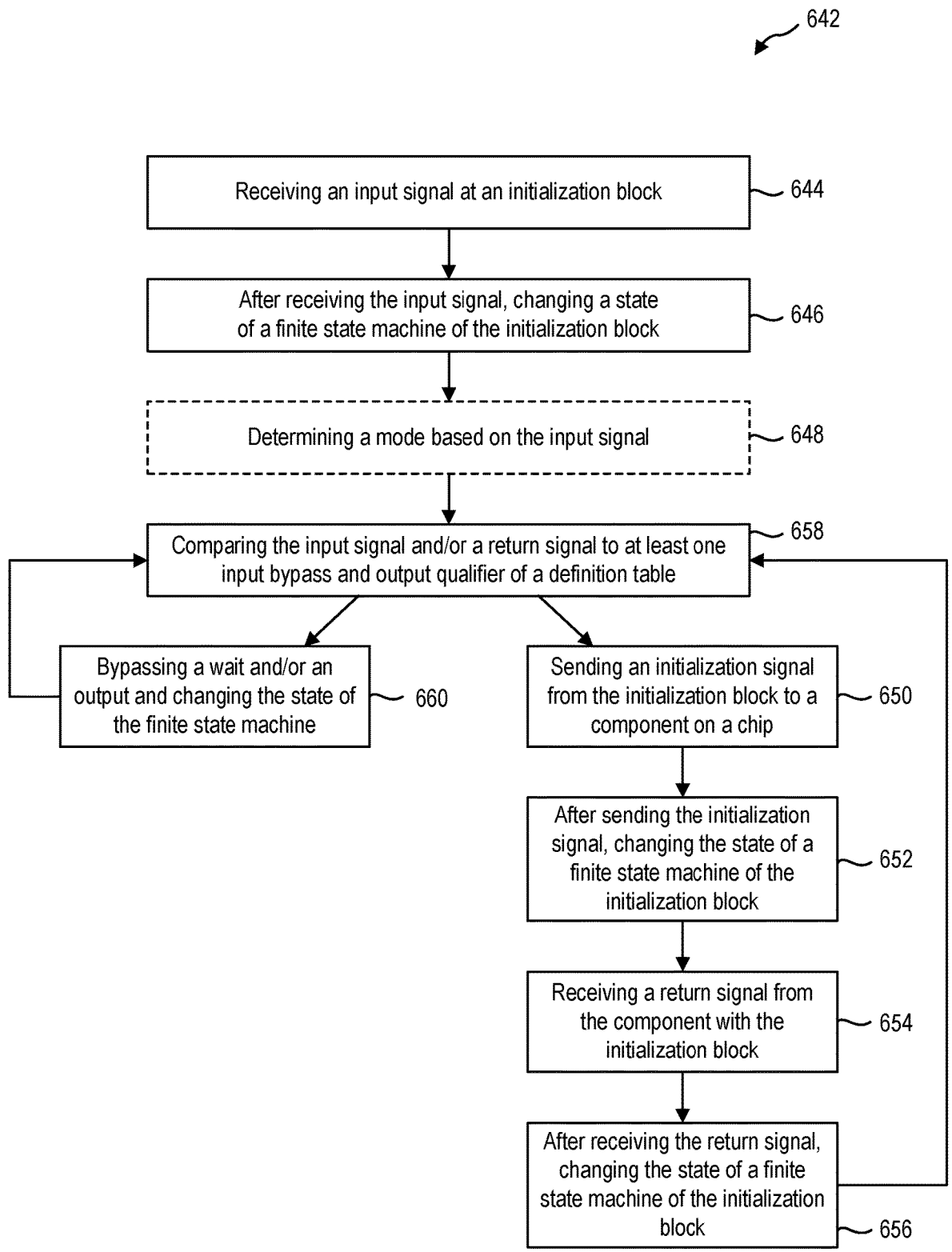
FIG. 7 is a flowchart illustrating a method of adaptive hardware initialization, according to at least embodiment of the present disclosure.

FIG. 7 is a flowchart illustrating another embodiment of a method 642 of initializing hardware according to the present disclosure. The method 642 includes receiving an input signal at an initialization block at 644. The input signal may originate from a local source on the chip, or a remote source that communicates with the chip, for example through an IO block or directly with the INIT block. In at least one case, the input signal is a power_up signal from a power supply.

After receiving the input signal, the method 642 includes changing the state of a FSM of the initialization block at 646. In some embodiments, changing the state of the FSM includes toggling the state from a first state to a second state. In other embodiments, changing the state of the FSM includes incrementing a counter of the FSM. In yet other embodiments, changing the state of the FSM includes incrementing a counter and toggling between a first state and a second state. The method 642 can optionally include determining a mode based on the input signal at 648.

In some embodiments, a method 642 according to the present disclosure includes comparing the input signal to at least one input bypass and output qualifier of a definition table at 658. If the input signal does not correspond to an input bypass or output qualifier of the definition table, the method 642 continues by sending an initialization signal from the initialization block to a component on a chip at 650. After sending the initialization signal, the method 642 further includes changing the state of the FSM again at 652.

As described herein, changing the state of the FSM can include incrementing a counter, toggling a state, or both.

The initialization signal sent to the component will initialize the component and prompt a return signal from the component to the INIT block. The method 642 further includes receiving the return signal from the component at the INIT block 654 and then changing the state of the FSM at 656. The method 642 can repeat the sending portion at 650 and receiving portion at 652 of the method 642 (and associated FSM state changes at 652 and 656) to communicate with additional components to initialize the entire chip and/or device.

When the input signal corresponds to an input bypass or does not correspond to an output qualifier of the definition table, the method 642 continues by bypassing a wait or an output and changing the state of the FSM at 660. For example, when the FSM is in a Receive state, the INIT block waits for a signal before continuing the procedure. However, if the input signal and/or return signal corresponds to an input bypass, the INIT block will bypass the wait for the signal and continue the initialization procedure. In other examples, when the INIT block is in a Transmit state, the INIT block will assert an output when the input signal and/or return signal corresponds to the output qualifier.

The method 642 includes iterating through comparing an input signal and/or a return signal to the definition table until the initialization procedure is complete. By iterating through, the initialization procedure can initialize all of the needed components of the electronic device or chip by communicating through the INIT block. As described herein, by maintaining the initialization procedure communications routed through the INIT block, the procedure can be more easily scalable, reusable, viewable, and debuggable, providing a more robust and reliable system.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for initializing hardware components of an electronic device, the method comprising:
   receiving an input signal at an initialization block of the electronic device;
   after receiving the input signal, changing a state of a finite state machine (FSM) of the initialization block;
   sending an initialization signal from the initialization block to a hardware component of the electronic device;
   after sending the initialization signal, changing the state of the FSM;
   receiving a return signal from the hardware component with the initialization block in response to the initialization signal sent to the hardware component; and
   after receiving the return signal, changing the state of the FSM according to the return signal.

2. The method of claim 1, the input signal including information from a plurality of components of the electronic device.

3. The method of claim 1, changing the state of the FSM including incrementing a counter.

4. The method of claim 3, further comprising comparing a state number of the FSM to a definition table.

5. The method of claim 1, changing the state of the FSM including toggling between two states of the FSM.

6. The method of claim 5, further comprising comparing a state type of the FSM to a definition table.

7. The method of claim 1, sending an initialization signal including sending a plurality of initialization signals to a plurality of hardware components.

8. The method of claim 1, receiving a return signal including receiving a plurality of return signals from a plurality of hardware components.

9. The method of claim 1 further comprising determining a mode based on the input signal.

10. The method of claim 9, comparing the mode to a definition table to determine which outputs to assert.

11. The method of claim 1 further comprising comparing the return signal to an input bypass of a definition table.

12. The method of claim 1, further comprising comparing the return signal to an output qualifier.

13. The method of claim 1 further comprising viewing an initialization signal or a return signal over a sideband test interface.

14. An electronic device for controlling hardware initialization, the device comprising:
   a finite state machine (FSM) having a first set of states and a second set of states; and
   an input-output (IO) modifier having an input state and an output state, the IO modifier being in the input state when the FSM is in the first set of states and the IO modifier being in the output state when the FSM is in the second set of states.

15. The electronic device of claim 14, the FSM being an integer counter.

16. The electronic device of claim 14 further comprising memory thereon, the memory containing a definition table.

17. The electronic device of claim 16, the IO modifier being in communication with the memory to parse the definition table.

18. A computer chip comprising:
   an initialization (INIT) block including:
      a finite state machine (FSM) having a first set of states and a second set of states, and
      an input-output (IO) modifier having an input state and an output state, the IO modifier being in the input state when the FSM is in the first set of states and the IO modifier being in the output state when the FSM is in the second set of states; and
   an IP block in direct data communication with the INIT block.

19. The computer chip of claim 18, the INIT block being in data communication with a subsystem of the computer chip.

20. The computer chip of claim 19, the subsystem including
   a second INIT block including:
      a second finite state machine (FSM) having a first set of states and a second set of states, and
      a second IO modifier having an input state and an output state, the second IO modifier being in the input state when the second FSM is in the first set of states and the second IO modifier being in the output state when the second FSM is in the second set of states;
   and
   a second IP block in direct data communication with the second INIT block, wherein the INIT block is in data communication with the second INIT block.

* * * * *